United States Patent
Lee et al.

(10) Patent No.: US 12,280,772 B2
(45) Date of Patent: Apr. 22, 2025

(54) METHOD FOR PREVENTING VEHICLE COLLISION AND ELECTRONIC DEVICE

(71) Applicant: HON HAI PRECISION INDUSTRY CO., LTD., New Taipei (TW)

(72) Inventors: Wan-Jhen Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 256 days.

(21) Appl. No.: 17/987,863

(22) Filed: Nov. 16, 2022

(65) Prior Publication Data

US 2023/0322216 A1    Oct. 12, 2023

(30) Foreign Application Priority Data

Apr. 8, 2022   (CN) .......................... 202210380727.1

(51) Int. Cl.
| | |
|---|---|
| *B60W 30/09* | (2012.01) |
| *B60W 30/095* | (2012.01) |
| *B60W 50/14* | (2020.01) |
| *G06V 20/56* | (2022.01) |
| *G06V 20/58* | (2022.01) |

(52) U.S. Cl.
CPC ........ *B60W 30/0956* (2013.01); *B60W 50/14* (2013.01); *G06V 20/58* (2022.01); *G06V 20/588* (2022.01); *B60W 2420/408* (2024.01); *B60W 2554/80* (2020.02)

(58) Field of Classification Search
CPC .......... B60W 30/09; B60W 2554/804; B60W 30/095; B60W 2554/801; G05D 1/0289; G08G 1/166
See application file for complete search history.

(56) References Cited

U.S. PATENT DOCUMENTS

| | | | |
|---|---|---|---|
| 2018/0281782 A1* | 10/2018 | Salter ..................... | B60Q 1/525 |
| 2023/0111391 A1* | 4/2023 | Nayak ................... | G06V 20/58 |
| | | | 701/301 |
| 2023/0227026 A1* | 7/2023 | Furuya .................. | B60W 50/14 |
| | | | 701/301 |

* cited by examiner

*Primary Examiner* — Kenneth J Malkowski
(74) *Attorney, Agent, or Firm* — ScienBiziP, P.C.

(57) ABSTRACT

A method for preventing vehicle collision applied in an electronic device obtains a first image in the driving direction of a vehicle using the method (method vehicle), and detects a driving route of other vehicles in the first image, and takes one of the other vehicles in the first image as a target vehicle when it satisfies a first condition. The first condition comprises a vehicle being in the same lane as the method vehicle and having an opposing driving direction. The electronic device further detects whether a detectable distance between the method vehicle and the target vehicle is less than a preset distance, and generates a warning or a control command when the detectable distance is less than the preset distance.

17 Claims, 6 Drawing Sheets

METHOD FOR PREVENTING VEHICLE COLLISION AND ELECTRONIC DEVICE

This application claims priority to Chinese Patent Application No. 202210380727.1 filed on Apr. 8, 2022, in China National Intellectual Property Administration, the contents of which are incorporated by reference herein.

FIELD

The subject matter herein generally relates to road safety technology, in particular, relates to a method for preventing vehicle collision and an electronic device.

BACKGROUND

With more vehicles on the road, traffic accidents such as vehicle collisions also become more frequently. Therefore, collision warnings are issued in advance, which can largely avoid occurrences of traffic accidents such as vehicle collisions, and improve the safety of vehicle driving.

In prior art, when an actual distance between one's own vehicle (hereinafter referred to as "self-vehicle") and the vehicle in front (hereinafter referred to as "front vehicle") is less than a safe distance, a warning is given so that the drivers can take appropriate steps in time. However, in a scenario where many vehicles are on the road at the same time, a vehicle being driven normally may be determined as a potential danger based on the actual distance between the vehicles being less than the safe distance, resulting in a large number of misjudgments. It may be detrimental if the driver is constantly receiving warning signals.

BRIEF DESCRIPTION OF THE DRAWINGS

Implementations of the present disclosure will now be described, by way of embodiment, with reference to the attached figures.

DETAILED DESCRIPTION

Figure 1:
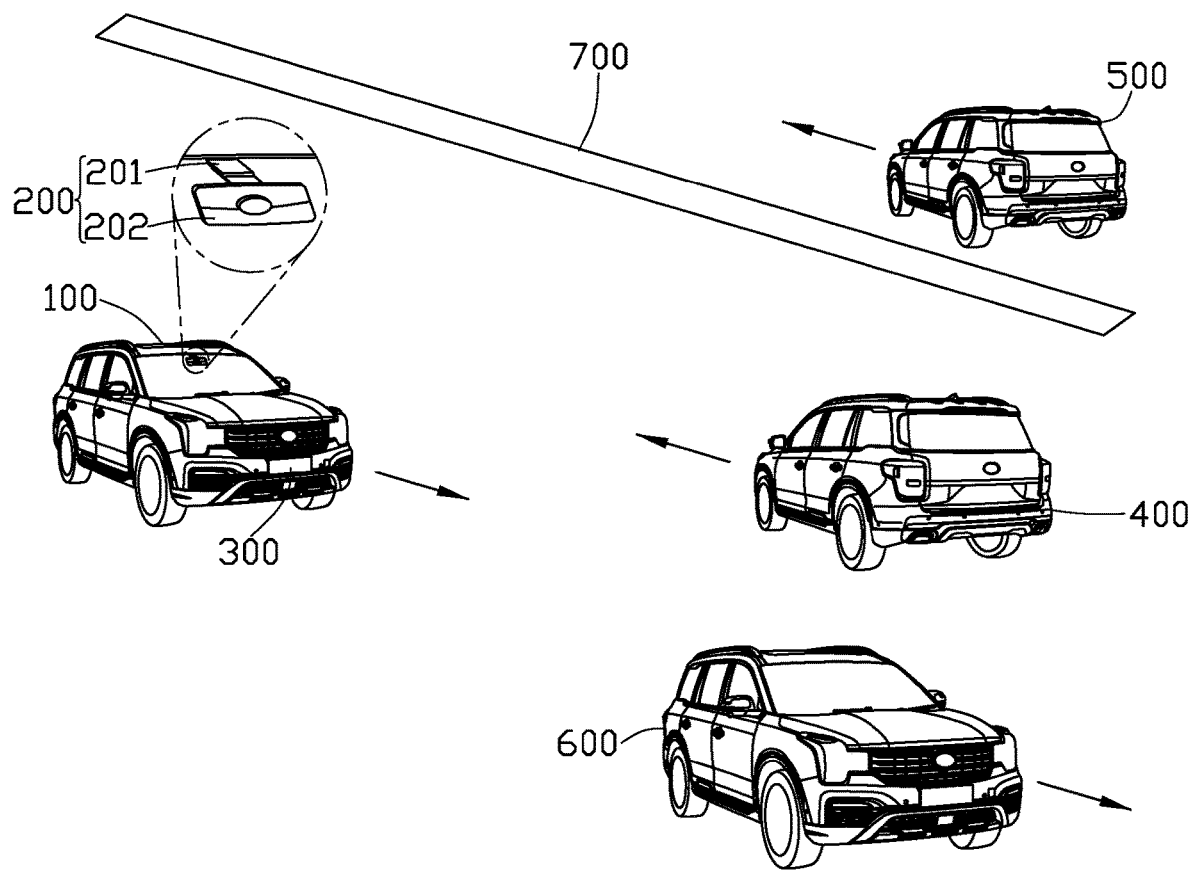
FIG. 1 is an application scenario of a method for preventing vehicle collision.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an application scenario of a method for preventing vehicle collision.

Referring to FIG. 1, the application scene includes a first vehicle 100, an anti-collision module 200, a radar 300, driving vehicles 400, 500, 600 and lane lines 700. The lane lines 700 are used to distinguish different lanes of a roadway. The driving vehicles 400, 500, and 600 are all in front of the first vehicle 100. The first vehicle 100 and the driving vehicles 400 and 600 are in the same lane, and the first vehicle 100 and the driving vehicle 500 are in different lanes. The arrows in FIG. 1 represent the driving directions of the vehicles. The driving directions of the first vehicle 100 and the driving vehicles 600 are the same, and the driving directions of the driving vehicles 400 and driving 500 are the same. The driving direction of the first vehicle 100 is opposite to that of the driving vehicles 400 and 500.

In one embodiment, where the anti-collision module 200 and the radar 300 are installed on the first vehicle 100, the anti-collision module 200 and the radar 300 cooperate to work together, so that the anti-collision module 200 sends an early warning to the driver of the first vehicle 100 if it determines that the first vehicle 100 may collide another vehicle, which plays an early warning role in preventing collisions.

Figure 3:
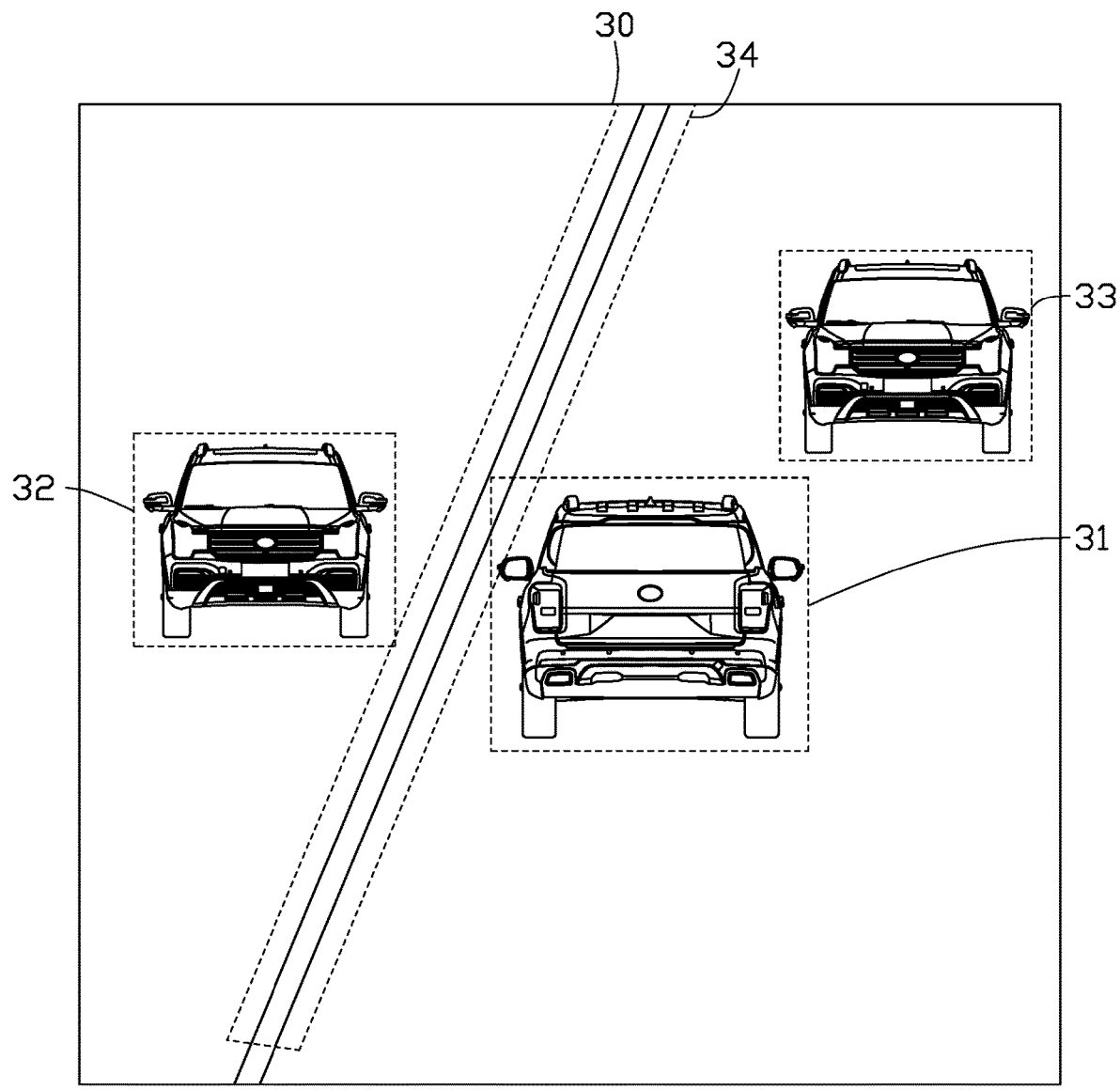
FIG. 3 is a schematic diagram of one embodiment of a first image in the method according to FIG. 1.

In one embodiment, the anti-collision module 200 includes a processor 201 and a camera 202. The processor 201 and the camera 202 are installed, and the driving direction of the first vehicle 100 is a first driving direction. During movement of the first vehicle 100 in the first driving direction, the camera 202 captures images. The processor 201 obtains the images captured by the camera 202 (as shown in FIG. 3), and the processor 201 processes the images captured by the camera 202 and determines whether there is a vehicle that may collide with the first vehicle 100.

In one embodiment, the processor 201 may be a general-purpose processor, including a Central Processing Unit (CPU), a Network Processor (NP), and the like. In one embodiment, the processor 201 may also be a Digital Signal Processor (DSP), an Application Specific Integrated Circuit (ASIC), a Field Programmable Gate Array (FPGA), a programmable logic device, a discrete gate or transistor logic device, or a discrete hardware component.

In one embodiment, the camera 202 may function as a driving recorder. The driving recorder is an instrument that records related information such as a first image 30 and sound during the driving of the vehicle. After the first vehicle 100 is installed with the driving recorder, the driving recorder can record the first image 30 and sound of entire driving process of the first vehicle 100, and one of the core purposes of the driving recorder is to provide effective evidence for traffic accidents. As an example, in addition to the above functions, the functions provided by the driving recorder may also include functions such as a Global Positioning System (GPS) positioning, capturing track or route of driving, reversing the first image 30, remote monitoring, and navigation.

In one embodiment, the radar 300 is installed in the first vehicle 100. The radar 300 is an electronic device that detects a target object by using electromagnetic waves. The radar 300 emits the electromagnetic waves towards the target and receives its echoes, thereby obtaining information such as the distance, distance change rate (radial velocity), azimuth, and altitude from the target object to source point of electromagnetic waves. In one embodiment, the radar 300 is connected to the processor 201 of the anti-collision module 200, and the radar 300 transmits obtained information (distance, speed, etc.) to the processor 201, and the processor 201 determines whether there is a vehicle that may collide with the first vehicle 100 according to the obtained information.

In one embodiment, the radar 300 may be installed in front part of the first vehicle 100, and the radar 300 may be a vehicle-mounted millimeter-wave radar 300, an ultrasonic radar 300, etc. The embodiment of the present disclosure does not specifically limit installation position and type of the radar 300.

In one embodiment, the processor 201 can perform comprehensive processing of the images collected by the camera 202 and the information collected by the radar 300 to determine whether there is a vehicle that may collide with the first vehicle 100.

In one embodiment, the first vehicle 100 also includes a display screen (not shown), and the processor 201 is connected to the display screen. When the processor 201 determines that a collision is about to occur, a warning message is displayed on the display screen.

In one embodiment, the first vehicle 100 also includes a speaker (not shown), the processor 201 is connected to the speaker. When the processor 201 determines that the vehicle is about to collide, a warning sound or message is played by the speaker.

Figure 2:
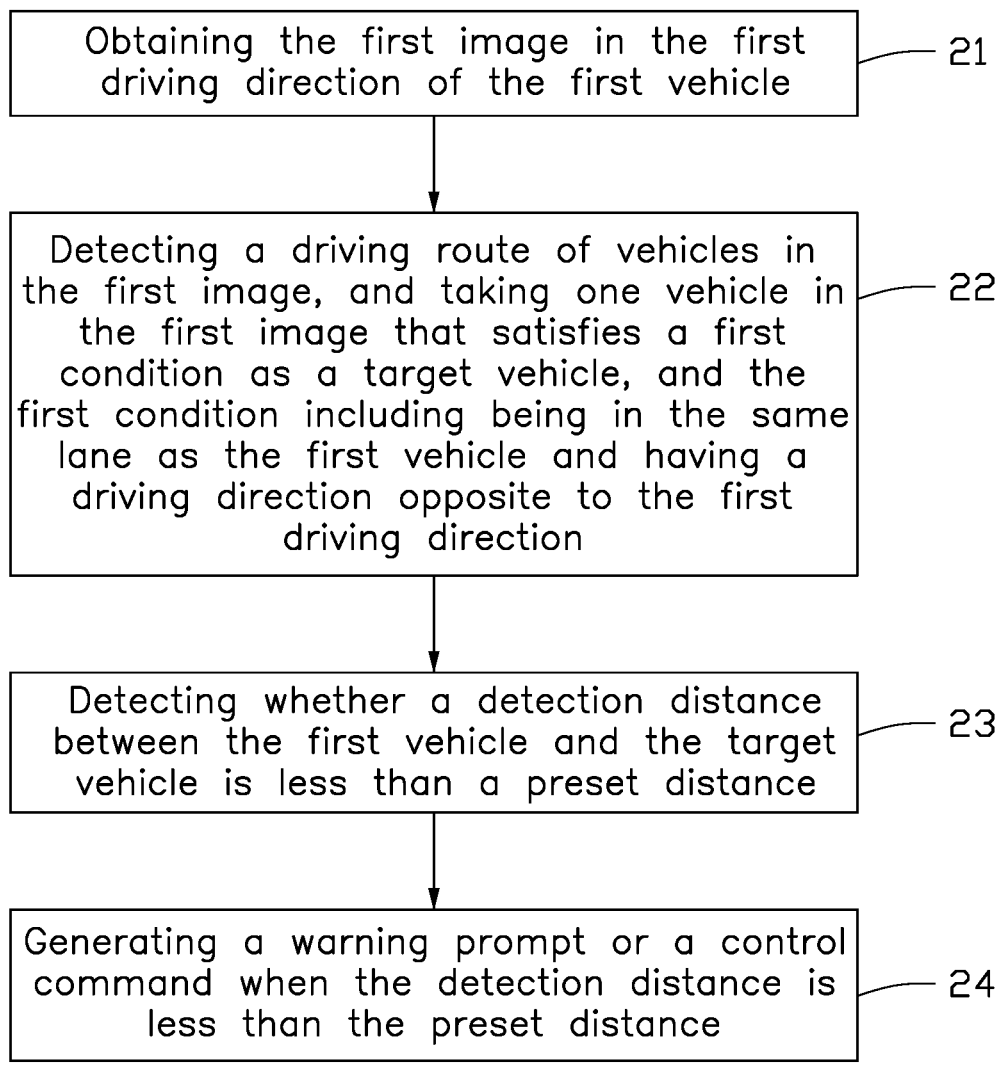
FIG. 2 is a flowchart of one embodiment of the method of FIG. 1.

FIG. 2 illustrates the method for preventing vehicle collision. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 21.

At block 21, obtaining the first image in the first driving direction of the first vehicle 100.

In one embodiment, the camera 202 installed in front part of the first vehicle 100 captures images in front of the first vehicle 100 in the first driving direction to obtain the first image 30. The processor 201 obtains the first image 30 (as shown in FIG. 3). The first image 30 can be collected by the camera 202 of the driving recorder. "First image 30" refers to an image obtained when the camera 202 installed in front part of the first vehicle 100 captures the image of scene in front of the first vehicle 100.

In one embodiment, the driving environment in front of the first vehicle 100 includes, but is not limited to, roads, other vehicles (such as driving vehicles 400, 500, 600), lane lines 700, isolation belts or green belts, traffic signs, traffic lights and light poles, buildings, bridge, etc., which are not specifically limited in the embodiments of the present disclosure.

In one embodiment, referring to FIG. 1 and FIG. 3 together, the first vehicle 100 is traveling in a first driving direction (the arrow of the first vehicle 100 in FIG. 1), and the camera 202 installed on the first vehicle 100 is traveling toward the first vehicle 100. The camera 202 collects images of the scene in front of the first vehicle 100 to obtain the first image 30. In FIG. 1, when the first vehicle 100 is driving in the first driving direction, the camera 202 can photograph the driving vehicles 400, 500, 600 and the lane line 700.

At block 22, detecting a driving direction and path (driving route) of vehicles in the first image, and taking one vehicle in the first image that satisfies a first condition as a target vehicle. The first condition stipulates that other vehicle is in the same lane as the first vehicle and having a driving direction opposite to the first driving direction.

In one embodiment, after obtaining the first image 30, the processor 201 performs image processing on the first image 30, detects the driving route of the vehicle in the first image 30, and takes the vehicle in the first image 30 that satisfies the first condition as the target vehicle. In one embodiment, the driving route of the vehicle includes the driving direction of the vehicle and the lane in which the vehicle is located.

In one embodiment, the processor 201 recognizes vehicle characteristics of the vehicles in the first image 30, and the vehicle characteristics include a vehicle front and a vehicle rear. The lane line 700 in the first image 30 is recognized, and the driving direction of the vehicle is determined according to the vehicle characteristics of the vehicle. When the vehicle characteristics of the vehicle include the vehicle front, the driving direction of the vehicle is opposite to the first driving direction; and when the vehicle characteristics of the vehicle is the vehicle rear, the driving direction of the vehicle is in same direction as the first driving direction. The lane in which the vehicle is located is determined according to the lane line 700. The driving route of the vehicle is determined according to the lane and the driving direction.

As shown in FIG. 3, the processor 201 recognizes the vehicles from the first image 30, and recognizes three vehicle image areas including vehicles from the first image 30, the three vehicle image areas includes a first vehicle image area 31 including the driving vehicle 400, a second vehicle image area 32 including the driving vehicle 500 and a third vehicle image area 33 including the driving vehicle 600. The processor 201 recognizes the three vehicle image areas, and recognizes the vehicle characteristics corresponding to the three vehicle image areas.

The processor 201 recognizes that the vehicle characteristics of the first vehicle image area 31 include the vehicle front, that is, the vehicle front of the driving vehicle 400 is captured by the first image 30. The processor 201 recognizes that the vehicle characteristics of the second vehicle image area 32 include the vehicle front, that is, the vehicle front of the driving vehicle 500 is captured by the first image 30. The processor 201 recognizes that the vehicle characteristics of the third vehicle image area 33 include the vehicle rear, that is, the first image 30 captures the vehicle rear of the driving vehicle 600.

The processor 201 determines the driving direction of each driving vehicle according to the vehicle characteristics of each vehicle image area. For example, when the vehicle characteristics of the first vehicle image area 31 include the vehicle front, the driving direction of the driving vehicle 400 is opposite to the first driving direction of the first vehicle 100. When the vehicle characteristics of the second vehicle image area 32 include the vehicle front, the driving direction of the driving vehicle 500 is opposite to the first driving direction of the first vehicle 100. When the vehicle characteristics of the third vehicle image area 33 include the vehicle rear, the driving direction of the driving vehicle 600 is the same as the first driving direction of the first vehicle 100.

In one embodiment, the processor 201 recognizes the lane line 700 in the first image 30, determines the lane line image area 34 as including the lane line 700, and determines the lane in which each vehicle is located according to the vehicle image area which includes each driving vehicle. For example, a proportion of the image area located on one side of the lane line 700 in the first image 30 (such as the side where the vehicle image area 32 is located) is less than a proportion of the image area located on the other side of the lane line 700 in the first image 30 (such as the side where the vehicle image area 31 is located)), thus it can be determined that the first vehicle 100 and the driving vehicle 400 of the first vehicle image area 31 are in the same lane. Therefore, it can be determined that the driving vehicle 400 and the first vehicle 100 are in the same lane, the driving vehicle 500 and the first vehicle 100 are in a different lane, and the driving vehicle 600 and the first vehicle 100 are in the same lane.

The processor 201 can determine the driving route of the driving vehicle according to the driving direction and the lane in which the driving vehicle is located, and it can be determined that the driving vehicle 400 and the first vehicle 100 are in the same lane but moving in opposite directions. The driving vehicle 500 and the first vehicle 100 are in different lanes, and the driving directions are opposite. The driving vehicle 400 and the first vehicle 100 are in the same lane and have the same driving direction. The processor 201 determines that the vehicle in the first image 30 that satisfies the first condition is the driving vehicle 400, since the driving vehicle 400 and the first vehicle 100 are located in the same lane and with opposite driving directions, thus the driving vehicle 400 is determined as the target vehicle.

At block 23, detecting whether a detection distance between the first vehicle and the target vehicle is less than a preset distance.

Figure 4:
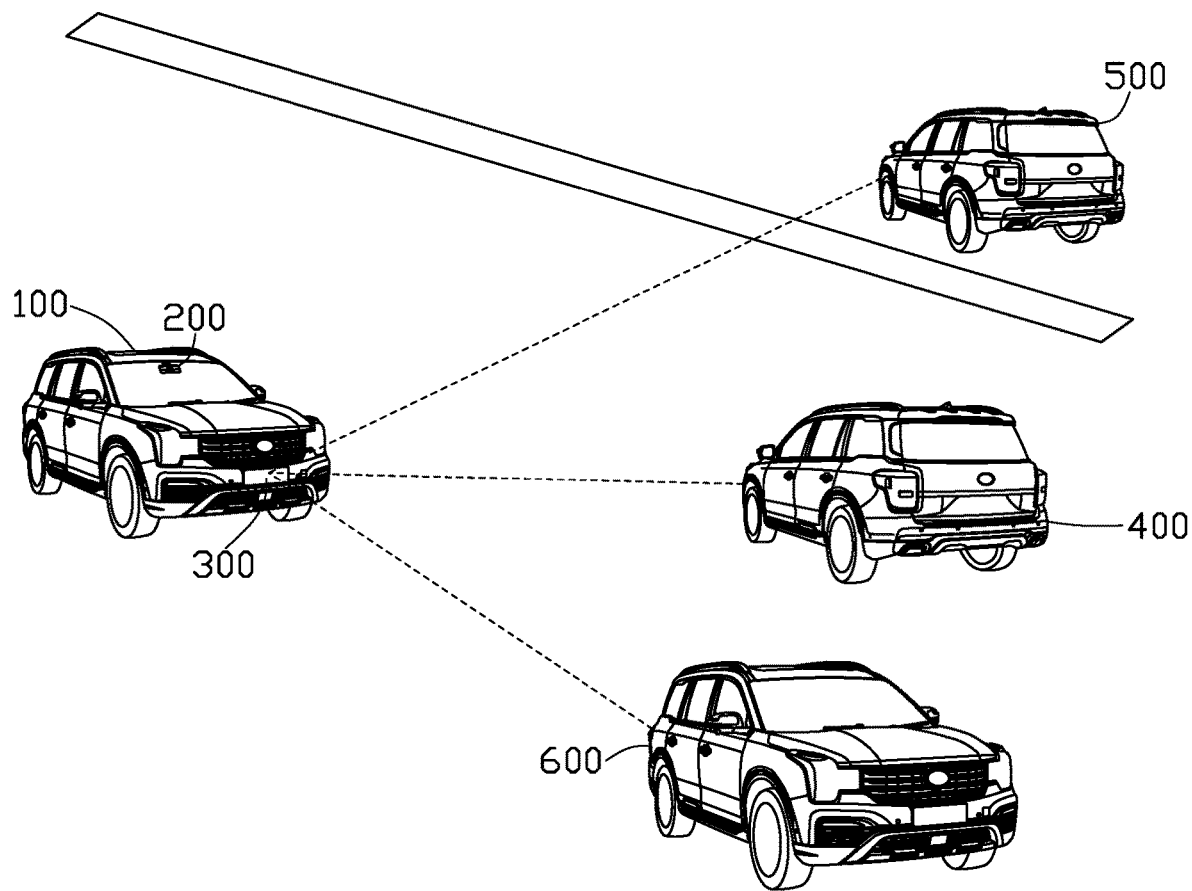
FIG. 4 is a schematic diagram of one embodiment of a radar in a working state in the method according to FIG. 1.

Referring to FIG. 4, after the first vehicle 100 determines that the target vehicle is the driving vehicle 400, the first vehicle 100 detects the detection distance between the first vehicle 100 and the driving vehicle 400. The radar 300 installed on the first vehicle 100 transmits pulses in all directions. After the pulses are irradiated to the driving vehicles 400, 500, and 600 in the driving environment, the radar 300 can receive the echoes reflected by the driving vehicles 400, 500, and 600. The wave pulse allows measurement of the time difference between a time when transmitting the pulse and a time when receiving the echo pulse. As the electromagnetic wave travels at the speed of light, a precise distance between the radar 300 and the driving vehicles 400, 500, and 600 can be calculated accordingly. It can be understood that the radar 300 emits the electromagnetic waves to irradiate the target object and receives its echoes, thereby obtaining information such as the detection distance, a distance change rate (radial velocity), an azimuth, and an altitude from the target object to the electromagnetic wave emission point. Therefore, the radar 300 can obtain the azimuth of each driving vehicle, and the radar 300 sends the information such as the distance, the distance change rate (radial velocity), the azimuth, and the altitude of each driving vehicle to the processor 201. The processor 201 can determine an orientation of the target vehicle (i.e. the driving vehicle 400) according to the first image 30, and can determine the detectable distance between the first vehicle 100 and the target vehicle according to the information sent by the radar 300.

In one embodiment, the preset distance can be 7 m, 9 m, or 10 m, and the preset distance can be considered a safe driving distance.

In one embodiment, the first vehicle 100 obtains the distance between the first vehicle 100 and the target vehicle in other ways. For example, the processor 201 can project the point cloud data generated by the radar 300 onto the first image 30, and filter out parts of an area within a region of interest (i.e., the first vehicle image area 31 corresponding to the driving vehicle 400) in the first image, and calculate the distance between the coordinates of area part of the point cloud data within the region of interest and the first vehicle 100.

At block 24, generating a warning prompt or a control command when the detection distance is less than the preset distance.

In one embodiment, when the processor 201 determines that the detection distance is less than the preset distance, it generates the warning prompt or a control command, for example, generating the warning prompt "collision, watch out!!", or outputting the control command to control a steering of the first vehicle 100.

In one embodiment, when the detection distance is less than the preset distance, the target vehicle in the image obtained by the first vehicle 100 is marked, and the image is displayed on the display screen.

In one embodiment, the method further includes: obtaining a first speed of the first vehicle 100, obtaining a second speed of the target vehicle, determining whether the first vehicle 100 and the target vehicle could collide according to the first speed and the second speed.

In one embodiment, the first speed of the first vehicle 100 can be obtained by the radar 300, and the second speed of the target vehicle can be obtained by the processor 201. When the first speed is greater than the second speed, it can be determined that a probability of the collision between the first vehicle 100 and the target vehicle is relatively small, and it is determined that the first vehicle 100 should not collide with the target vehicle. When the first speed is less than the second speed, it can be determined that the probability of the collision between the first vehicle 100 and the target vehicle is relatively high, and it is determined that the collision between the first vehicle 100 and the target vehicle is likely to occur.

In one embodiment, a principle of radar measuring speed is a Doppler effect generated by the radar 300 according to a relative motion between the first vehicle 100 and the target vehicle. A target echo frequency received by the radar 300 is different from a transmission frequency of the radar 300, and a difference between the target echo frequency and the transmission frequency is called the Doppler effect on frequency. One of the main pieces of information that can be extracted from the Doppler effect is a rate of distance change between the radar 300 and the target vehicle. When the target vehicle and electronic or other clutter exist in a same spatial resolution unit of the radar 300 at the same time, the radar 300 can detect and track the target vehicle in spite of the interfering clutter by using the difference in Doppler frequency.

In one embodiment, when the vehicle is driven, it is necessary to determine whether the vehicle in the first image 30 collected by the first vehicle 100 shows a risk of collision. In addition to the speed, the travel route and the direction of the vehicle are very important information. In order to accurately obtain a result that the first vehicle 100 may collide with other vehicles on its travel route, it is very important to minimize misjudgments and missed judgments. If all possibilities are covered, there may be many misjudgments, and if warnings are simply repeated, the judgments of the anti-collision module 200 cannot be trusted. For example, at an intersection, the first vehicle 100 needs to turn right, and if an oncoming vehicle also needs to turn right, theoretically, the vehicle does not need to be referenced by the system. The processor 201 recognizes the vehicle in the first image 30 and the vehicle front or the vehicle rear, and then recognizes the lane line 700 to determine that the driving vehicle is located in the other lane or same lane as the first vehicle 100. The possible driving route of the vehicle in the first image 30 can be determined preferentially by combining the above two pieces of information. The distance information provided by the radar 300 is used to determine the distance between the vehicle in front and the first vehicle 100. The possible driving route of the vehicle with the distance between the driving vehicle and the first vehicle 100 are combined, and vehicles that are far away are filtered out, as faraway vehicles will have a lower probability of collision. If the first vehicle 100 is in the same lane with the target vehicle and the first image 30 includes the vehicle head of the target vehicle, a collision is likely. If the target car is in the other lane, target car can be temporarily ignored.

The present disclosure uses the information of the first image 30 and the radar 300 to do a preliminary filtering to mark the target vehicle with collision risk, and then use different methods to obtain a relative speed of the vehicle to determine whether a collision will occur, and the driver of the vehicle is reminded to brake or steer in timely fashion to avoid a collision. The above method filters out most distant vehicles and vehicles with a low probability value of collision in the opposite lane, which can effectively reduce misjudgments. For example, vehicles that are far away but are facing the driving vehicle, if there is no information provided by radar 300 to determine whether a collision is likely, it may be determined that the collision will occurs, or vehicles in the opposite lane are closer but less likely to collide with other vehicles.

Figure 5:
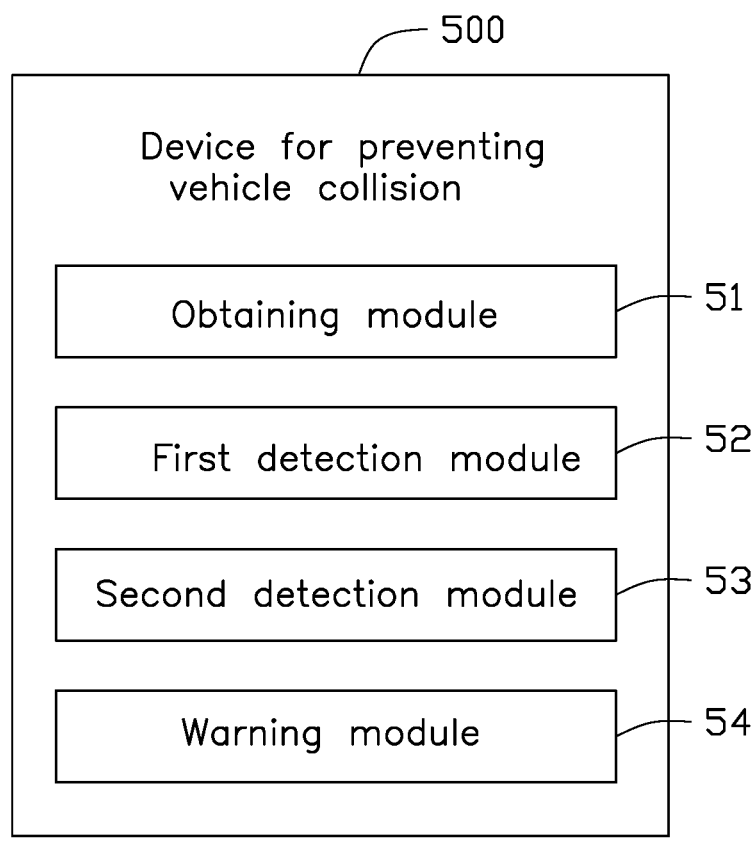
FIG. 5 is a schematic diagram of one embodiment of a device for preventing vehicle collision.

FIG. 5 illustrates a device 50 for preventing vehicle collision. The device 50 includes an obtaining module 51, a first detection module 52, a second detection module 53, and a warning module 54.

The obtaining module 51 obtains the first image 30 in the first driving direction of the first vehicle 100.

The first detection module 52 detects a driving route of vehicles in the first image, and takes one vehicle in the first image that satisfies a first condition as a target vehicle, the first condition stipulating that other vehicle is in the same lane as the first vehicle and having an opposing driving direction.

The second detection module 53 detects whether a detection distance between the first vehicle and the target vehicle is less than a preset distance.

The warning module 54 generates a warning prompt or a control command when the detection distance is less than the preset distance.

In one embodiment, the first detection module 52 includes a first recognition unit, a second recognition unit, a first determination unit, a second determination unit, and a third determination unit.

The first recognition unit recognizes vehicle characterizes of the vehicle in the first image 30, and the vehicle characterizes include a vehicle front and a vehicle rear.

The second recognition unit is used to recognize a lane line 700 in the first image 30.

The first determining unit determines the driving direction of the vehicle according to the vehicle characteristics of the vehicle.

The second determining unit determines the lane where the vehicle is located according to the lane line 700.

The third determining unit determines the driving route of the vehicle according to the lane in which the vehicle is located and the driving direction.

In one embodiment, the first determining unit determines the driving direction of the vehicle is opposite to the first driving direction when the vehicle characterizes of the vehicle is the vehicle front. The first determining unit determines the driving direction of the vehicle is the same as the first driving direction when the vehicle characterizes of the vehicle is the vehicle rear.

Figure 6:
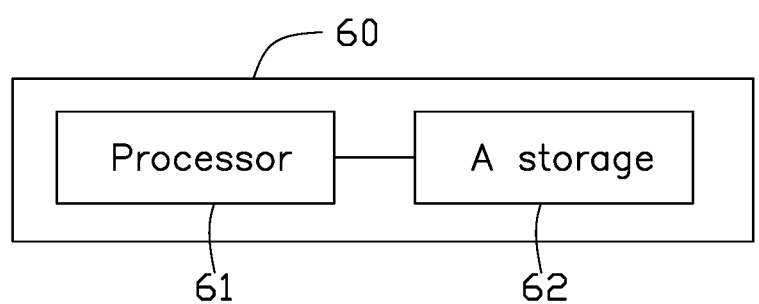
FIG. 6 is a schematic diagram of one embodiment of an electronic device.

FIG. 6 illustrates the electronic device 60. The electronic device 60 includes at least one processor 61, and a storage 62. The storage 62 stores logic instructions. The processor 61 may invoke logic instructions stored in the storage 62 to perform the methods in the above-described embodiments. The processor 61 is the processor 201 in FIG. 1.

The above-mentioned logic instructions in the storage 62 can be implemented in the form of software functional units and can be stored in a computer storage medium when sold or used as an independent product.

The storage 62 may be configured to store software programs, computer-executable programs, such as program instructions or modules corresponding to the methods in the embodiments of the present disclosure. The processor 61 executes functional applications and data processing by running software programs, instructions or modules stored in the storage 62, that is, to implement the methods in the above embodiments.

The storage 62 may include a storage program area and a storage data area, and the storage program area may store an operating system, an application program required for at least one function; the storage data area may store data created according to the use of the terminal device, and the like. In one embodiment, the storage 62 may include high-speed random access computer storage media, and may also include a non-volatile computer storage media, for example, a U disk, a mobile hard disk, a Read-Only Memory (ROM), a Random Access Memory (RAM), a magnetic disk or an optical disk and other media that can store program codes, or temporary state storage medium.

The processor 61 loads and executes one or more instructions stored in the storage 62 to realize the corresponding steps of the method shown in FIG. 2. In a specific implementation, one or more instructions in the computer storage medium are loaded by the processor 61 and execute the above blocks 21-24.

The exemplary embodiments shown and described above are only examples. Even though numerous characteristics and advantages of the present disclosure have been set forth in the foregoing description, together with details of the structure and function of the present disclosure, the disclosure is illustrative only and changes may be made in the detail, including in matters of shape, size, and arrangement of the parts within the principles of the present disclosure, up to and including the full extent established by the broad general meaning of the terms used in the claims.

What is claimed is:

1. A method for preventing vehicle collision comprising:
obtaining a first image viewed from a first vehicle in a first driving direction;
recognizing vehicle characteristics of vehicles in the first image, and the vehicle characteristics comprising a vehicle front and a vehicle rear; determining that driving directions of the vehicles in the first image are opposite to the first driving direction in responses that the vehicle characterizes of the vehicles comprise the vehicle front; determining that the driving directions of the vehicles in the first image are same as the first driving direction in responses that the vehicle characteristics of the vehicles comprise the vehicle rear;
detecting a driving route of vehicles in the first image, and taking one of the vehicles in the first image that satisfies a first condition as a target vehicle, and the first condition comprising a vehicle being in a same lane as the first vehicle and having a driving direction opposite to the first driving direction;
detecting whether a detection distance between the first vehicle and the target vehicle is less than a preset distance; and
generating a warning prompt or a control command in responses that the detection distance is less than the preset distance.

2. The method as claimed in claim 1, further comprising:
recognizing lane lines in the first image;
determining lanes in which the vehicles are located according to the lane lines, wherein
the driving route of vehicles in the first image is detected according to the lanes wherein the vehicles are and the driving directions of the vehicles in the first image.

3. The method as claimed in claim 1, further comprising:
marking the target vehicle in the first image in responses that the detection distance is less than the preset distance.

4. The method as claimed in claim 1, further comprising:
obtaining a first speed of the first vehicle;
obtaining a second speed of the target vehicle;
determining whether the first vehicle and the target vehicle collide according to the first speed and the second speed.

5. The method as claimed in claim 1, further comprising:
determining the detection distance between the first vehicle and the target vehicle according to information sent by a radar.

6. The method as claimed in claim 1, wherein the preset distance is one of 7 m, 9 m, and 10 m.

7. An electronic device comprising:
a processor; and
a non-transitory storage medium coupled to the processor and configured to store a plurality of instructions, which cause the processor to:
obtain a first image viewed from a first vehicle in a first driving direction;
recognize vehicle characteristics of vehicles in the first image, and the vehicle characteristics comprising a vehicle front and a vehicle rear; determining that driving directions of the vehicles in the first image are opposite to the first driving direction in responses that the vehicle characterizes of the vehicles comprise the vehicle front; determining that the driving directions of the vehicles in the first image are same as the first driving direction in responses that the vehicle characteristics of the vehicles comprise the vehicle rear;
detect a driving route of vehicles in the first image, and take one of the vehicles in the first image that satisfies a first condition as a target vehicle, and the first condition comprising a vehicle being in a same lane as the first vehicle and having a driving direction opposite to the first driving direction;
detect whether a detection distance between the first vehicle and the target vehicle is less than a preset distance;
generate a warning prompt or a control command in responses that the detection distance is less than the preset distance.

8. The electronic device as claimed in claim 7, wherein the plurality of instructions are further configured to cause the processor to:
recognize lane lines in the first image;
determine lanes in which the vehicles are located according to the lane lines, wherein
the driving route of vehicles in the first image is detected according to the lanes wherein the vehicles are and the driving directions of the vehicles in the first image.

9. The electronic device as claimed in claim 7, wherein the plurality of instructions are further configured to cause the processor to:
mark the target vehicle in the first image in responses that the detection distance is less than the preset distance.

10. The electronic device as claimed in claim 7, wherein the plurality of instructions are further configured to cause the processor to:
obtain a first speed of the first vehicle;
obtain a second speed of the target vehicle;
determine whether the first vehicle and the target vehicle collide according to the first speed and the second speed.

11. The electronic device as claimed in claim 7, wherein the plurality of instructions are further configured to cause the processor to:
determine the detection distance between the first vehicle and the target vehicle according to information sent by a radar.

12. The electronic device as claimed in claim 7, wherein the preset distance is one of 7 m, 9 m, and 10 m.

13. A non-transitory storage medium having stored thereon instructions that, in response that executed by at least one processor of an electronic device, causes the least one processor to execute instructions of a method for preventing vehicle collision, the method comprising:
obtaining a first image viewed from a first vehicle in a first driving direction;
recognizing vehicle characteristics of vehicles in the first image, and the vehicle characteristics comprising a vehicle front and a vehicle rear; determining that driving directions of the vehicles in the first image are opposite to the first driving direction in responses that the vehicle characterizes of the vehicles comprise the vehicle front; determining that the driving directions of the vehicles in the first image are same as the first driving direction in responses that the vehicle characteristics of the vehicles comprise the vehicle rear;
detecting a driving route of vehicles in the first image, and taking one of the vehicles in the first image that satisfies a first condition as a target vehicle, and the first condition comprising a vehicle being in a same lane as the first vehicle and having a driving direction opposite to the first driving direction;

detecting whether a detection distance between the first vehicle and the target vehicle is less than a preset distance;

generating a warning prompt or a control command in responses that the detection distance is less than the preset distance.

14. The non-transitory storage medium as recited in claim 13, wherein the method further comprises:

recognizing lane lines in the first image;

determining lanes in which the vehicles are located according to the lane lines, wherein the driving route of the vehicle is detected according to the lanes wherein the vehicles are and the driving directions of the vehicles in the first image.

15. The non-transitory storage medium as recited in claim 13, wherein the method further comprises:

marking the target vehicle in the first image in responses that the detection distance is less than the preset distance.

16. The non-transitory storage medium as recited in claim 13, wherein the method further comprises:

obtaining a first speed of the first vehicle;

obtaining a second speed of the target vehicle;

determining whether the first vehicle and the target vehicle collide according to the first speed and the second speed.

17. The non-transitory storage medium as recited in claim 13, wherein the method further comprises:

determining the detection distance between the first vehicle and the target vehicle according to information sent by a radar.

\* \* \* \* \*